US010489407B2

(12) United States Patent
Solanki et al.

(10) Patent No.: US 10,489,407 B2
(45) Date of Patent: Nov. 26, 2019

(54) DYNAMIC MODIFICATIONS OF RESULTS FOR SEARCH INTERFACES

(71) Applicant: eBay Inc., San Jose, CA (US)

(72) Inventors: Sameep Navin Solanki, San Jose, CA (US); Jayasimha Katukuri, Santa Clara, CA (US); Manas Haribhai Somaiya, Sunnyvale, CA (US); Rajyashree Mukherjee, Fremont, CA (US); Rakesh Setty, Sunnyvale, CA (US)

(73) Assignee: EBAY INC., San Jose, CA (US)

( * ) Notice: Subject to any disclaimer, the term of this patent is extended or adjusted under 35 U.S.C. 154(b) by 524 days.

(21) Appl. No.: 14/717,805

(22) Filed: May 20, 2015

(65) Prior Publication Data

US 2016/0085813 A1  Mar. 24, 2016

Related U.S. Application Data

(60) Provisional application No. 62/053,055, filed on Sep. 19, 2014.

(51) Int. Cl.
| G06F 17/30 | (2006.01) |
| G06F 16/2457 | (2019.01) |
| G06Q 30/06 | (2012.01) |
| G06Q 30/08 | (2012.01) |
| H04N 13/261 | (2018.01) |
| G06T 7/20 | (2017.01) |
| G06T 15/20 | (2011.01) |
| G06K 9/00 | (2006.01) |

(52) U.S. Cl.
CPC ..... *G06F 16/24575* (2019.01); *G06K 9/00342* (2013.01); *G06K 9/00671* (2013.01); *G06K 9/00912* (2013.01); *G06Q 30/0623* (2013.01); *G06Q 30/08* (2013.01); *G06T 7/20* (2013.01); *G06T 15/20* (2013.01); *H04N 13/261* (2018.05)

(58) Field of Classification Search
CPC ........ G06F 17/30528; G06K 9/00342; G06K 9/0067; G06K 9/00912
USPC ................ 705/26.3, 26.61, 400; 707/734
See application file for complete search history.

(56) References Cited

U.S. PATENT DOCUMENTS

| 6,606,619 | B2* | 8/2003 | Ortega | G06F 3/0482 |
| 7,577,665 | B2* | 8/2009 | Ramer | G06F 17/30867 |
| 2005/0149458 | A1* | 7/2005 | Eglen | G06Q 30/02 705/400 |
| 2007/0233671 | A1* | 10/2007 | Oztekin | G06F 17/30867 |
| 2012/0185349 | A1* | 7/2012 | Soroca | G06Q 30/02 705/26.3 |
| 2013/0151511 | A1* | 6/2013 | Yamahara | G06F 17/30554 707/723 |

(Continued)

*Primary Examiner* — Vanel Frenel
(74) *Attorney, Agent, or Firm* — Shook, Hardy & Bacon L.L.P.

(57) ABSTRACT

The present disclosure is directed to apparatuses, systems, and methods for enhancing search results based on recent user interactions. As described herein, embodiments may infer various refinements for search queries; these refinements are based, at least in part, on the user's recent interactions with the search platform (e.g., within a current session). In other words, as the user is interacting with the search platform, one or more refinements may be inferred to help make the search results more relevant to the user.

19 Claims, 12 Drawing Sheets

(56) References Cited

U.S. PATENT DOCUMENTS

2013/0173402 A1* 7/2013 Young ................ G06Q 30/0631
            705/14.73
2014/0279246 A1* 9/2014 Chen .................. G06Q 30/0623
            705/26.61

* cited by examiner 120 and 122

| Publication Application 200 | Auction Application(s) 202 | Fixed-Price Application(s) 204 |

| Store Application(s) 206 | Reputation Application(s) 208 | Personalization Application(s) 210 |

| Internationalization Application(s) 212 | Navigation Application(s) 214 | Imaging Application(s) 216 |

| Listing Creation (Seller) Application(s) 218 | Listing Management (Seller) Application(s) 220 | Post-Listing Management Application(s) 222 |

| Dispute Resolution Application(s) 224 | Fraud Prevention Application(s) 226 | Messaging Application(s) 228 |

| Merchandising Application(s) 230 | Loyalty Promotion Application(s) 232 |

DYNAMIC MODIFICATIONS OF RESULTS FOR SEARCH INTERFACES

PRIORITY CLAIM

This application claims the benefit of U.S. Provisional Application No. 62/053,066, filed Sep. 19, 2014, the entire contents of which are hereby incorporated by reference herein.

TECHNICAL FIELD

The present application relates generally to the technical field of data processing and, in particular, to enhancing the results generated for one or more received search queries.

BACKGROUND

A publication system provides a user interface for a user to access a wide variety of items and/or services for sale. The publication system may be accessed using a web browser, such as Google Chrome, Mozilla Firefox, Microsoft Internet Explorer, and other such web browsers. The publication system may accept search queries via the web browser to help a user find a particular offered item, such as a good or service. In response, the publication system may display a set of search results that match, and/or are related to, the received search query. However, the user may not be familiar with all the possible refinements allowed by a particular search platform, or these refinements may not be easily discoverable to the user.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIG. 2 illustrates exemplary applications executable by one or more application servers according to aspects of the disclosure.

FIGS. 6A-6C illustrate web pages of a publication system configured to receive search queries for items offered for sale by the publication system according to aspects of the disclosure.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

The present disclosure is directed to apparatuses, systems, and methods for enhancing search results based on recent user interactions. As described herein, embodiments may infer various refinements for search queries; these refinements are based, at least in part, on the user's recent interactions with the search platform—e.g., within a current session (wherein a session comprises a period of activity that a user with a unique IP address spends on a web page for a specified consecutive amount of time). In other words, as the user is interacting with the search platform, one or more refinements may be inferred to help make the search results more relevant to the user.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to execute the instructions.

Figure 1:
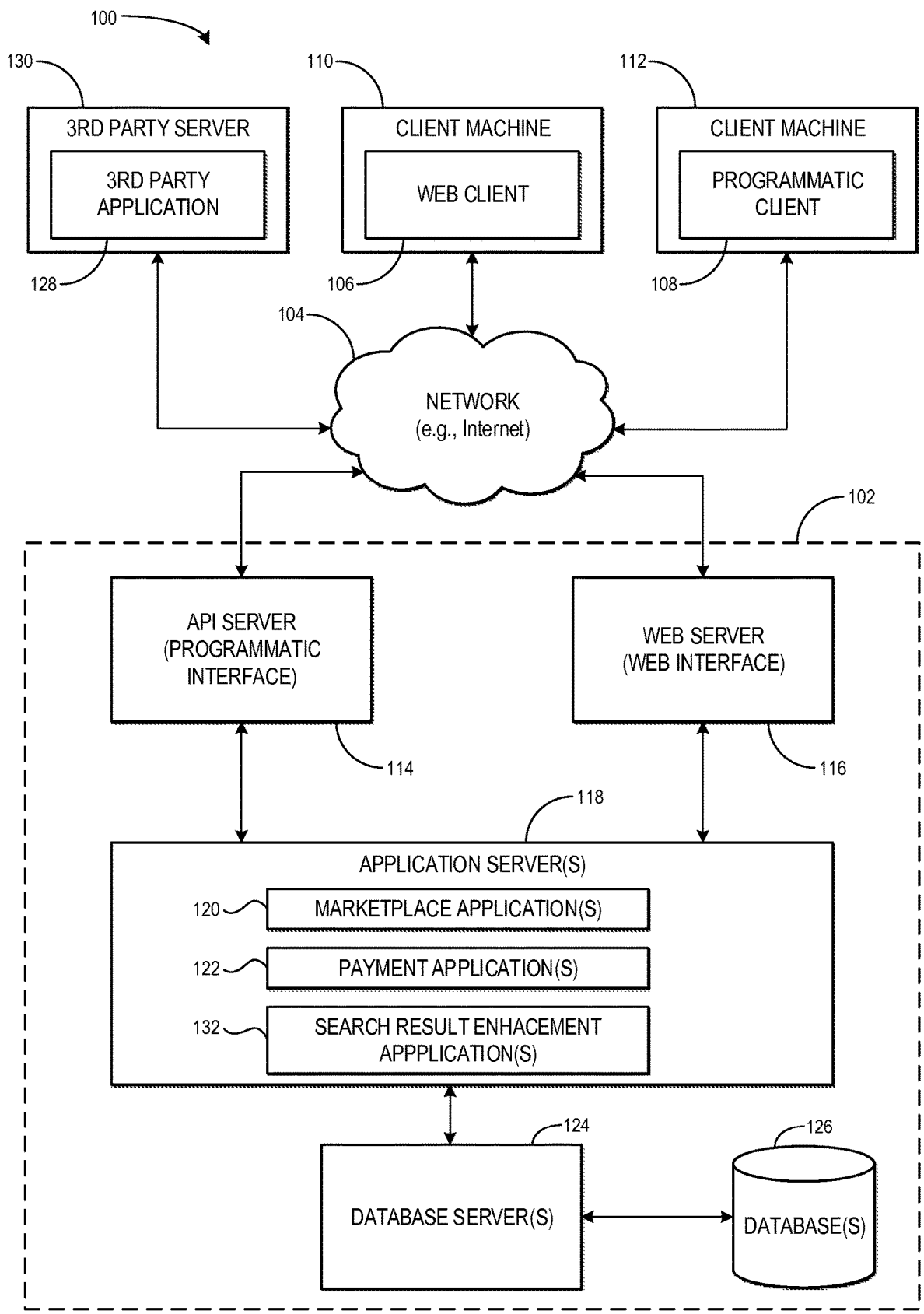
FIG. 1 illustrates a network architecture of an exemplary system according to aspects of the disclosure.

FIG. 1 is a network diagram depicting a client-server system 100 according to aspects of the disclosure. A networked system 102, in the example forms of a publication system, provides server-side functionality, via a network 104 (e.g., the Internet or a Wide Area Network (WAN)) to one or more client machines. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An Application Program Interface (API) server 114 and a web server 116 are coupled to, and provide programmatic and web interfaces respectively to, one or more application servers 118. The application server(s) 118 host one or more applications, such as a marketplace application(s) 120, a payment application(s) 122, and one or more search result enhancement applications 132. The application server(s) 118 are, in turn, shown to be coupled to one or more database servers 124 that facilitate access to one or more databases 126.

The marketplace application(s) 120 may provide a number of marketplace functions and services to users who access the networked system 102. The payment application(s) 122 may likewise provide a number of payment services and functions to users. The payment application(s) 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace application(s) 120.

The application server(s) 118 may also include the one or more search result enhancement application(s) 132 to dynamically enhance search results based on recent user interactions. As described in further detail below, embodiments may utilize a user's recent activity on a search platform to infer various refinements that might help the user to narrow the results to be more relevant to the user's interests. In other words, as the user is interacting with the search platform during a single session, one or more refinements may be inferred to help make the results more relevant for the user. More relevant results are more likely to lead to purchases by the user.

While the marketplace application(s) 120, the payment application(s) 122, and the search result enhancement application(s) 132 are shown in FIG. 1 to form part of the networked system 102, it will be appreciated that, in alternative embodiments, the applications 120, 122, and 132 may be separate and distinct from the networked system 102. For example, the payment application(s) 122 may form part of a payment service that is separate and distinct from the networked system 102.

Further, while the system 100 shown in FIG. 1 employs a client-server architecture, the embodiments are of course not limited to such an architecture, and could equally well find application in a distributed, or peer-to-peer, architecture system, for example. The marketplace application(s) 120, the payment application(s) 122, and the search result enhancement application(s) 132 could also be implemented as standalone software programs, which do not necessarily have networking capabilities.

The web client 106 may access the marketplace application(s) 120, the payment application(s) 122, and the search result enhancement application(s) 132 via the web interface supported by the web server 116. Similarly, the programmatic client 108 may access the various services and functions provided by the applications 120, 122, and 132 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, payment, or advertising functions that are supported by the relevant applications of the networked system 102.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services.

FIG. 2 illustrates exemplary applications that may be executable by the foregoing application server(s) 118 to support the aforementioned mechanisms. To this end, the marketplace application 120 and the payment application 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services that are also being offered for sale via an auction for a fixed price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact utilizing the networked system 102 to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing one of the appropriate personalization applications 210, create a personalized reference page on which information regarding transactions to which the user is (or has been) a party may be viewed. Further, one of the personalization applications 210 may enable a user to personalize listings and other aspects of the user's interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or they may be customized (or internationalized) presentations of a common underlying marketplace. The networked system 102 may, accordingly, include a number of internationalization applications 212 that customize information of (and/or the presentation of information by) the networked system 102 according to predetermined criteria (e.g., geographic, demographic, or marketplace criteria). For example, the internationalization applications 212 may be used to support the customization of information for a number of regional websites that are operated by the networked system 102 and that are accessible via the web server 116.

Navigation of the networked system 102 may be facilitated by one or more navigation applications 214. For example, a search application (as an example of one of the navigation applications 214) may enable keyword searches of listings published via the networked system 102. A browse application may allow users to browse various category, catalogue, or inventory data structures according to which listings may be classified within the networked system 102. Various others of the navigation applications 214 may be provided to supplement the search and browsing applications.

In order to make the listings available via the networked system 102 as visually informative and attractive as possible, the applications 120 and 122 may include one or more imaging applications 216, which users may utilize to upload images for inclusion within listings. The imaging applications 216 also operate to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more of the auction applications 202, a seller may wish to leave feedback regarding a particular buyer. To this end, one or more of the post-listing management applications 222 may provide an interface to one or more of the reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, the messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and may be offered a reward for which accumulated loyalty points can be redeemed.

Furthermore, and referring back to FIG. 1, the search result enhancement application(s) 132 may leverage one or more of the applications 200-232 in dynamically determining popular price ranges for one or more items based on one or more received search queries and in providing a meaningful display of this information. In other words, the search result enhancement application(s) 132 may invoke or use data gathered by the applications 200-232 in determining popular price ranges and/or points for a given search query, and which listings are ultimately displayed to the user as within the popular price ranges. For example, the search result enhancement application(s) 132 may obtain one or more search queries via the navigation application(s) 214, and prices for the various listings via the auction application(s) 202 and/or the fixed-price application(s) 204. The search result enhancement application(s) 132 may also access other applications shown in FIG. 2, such as the store application(s) 206, to obtain prices for items that were previously sold.

As the search result enhancement application(s) 132 may be integrated (e.g., directly or indirectly) with the application server(s) 118, the search result enhancement application(s) 132 may leverage the data obtained from the applications 200-232 and provide relatively up-to-date or current price ranges for items being offered through the electronic marketplace. This integration may further extend to the one or more database server(s) 124 and/or database(s) 126 in communication with the application server(s) 118. As discussed below, the search result enhancement application(s) 132 may access stored information, such as session logs, to dynamically determine popular price ranges for one or more items based on one or more received search queries.

Figure 3:
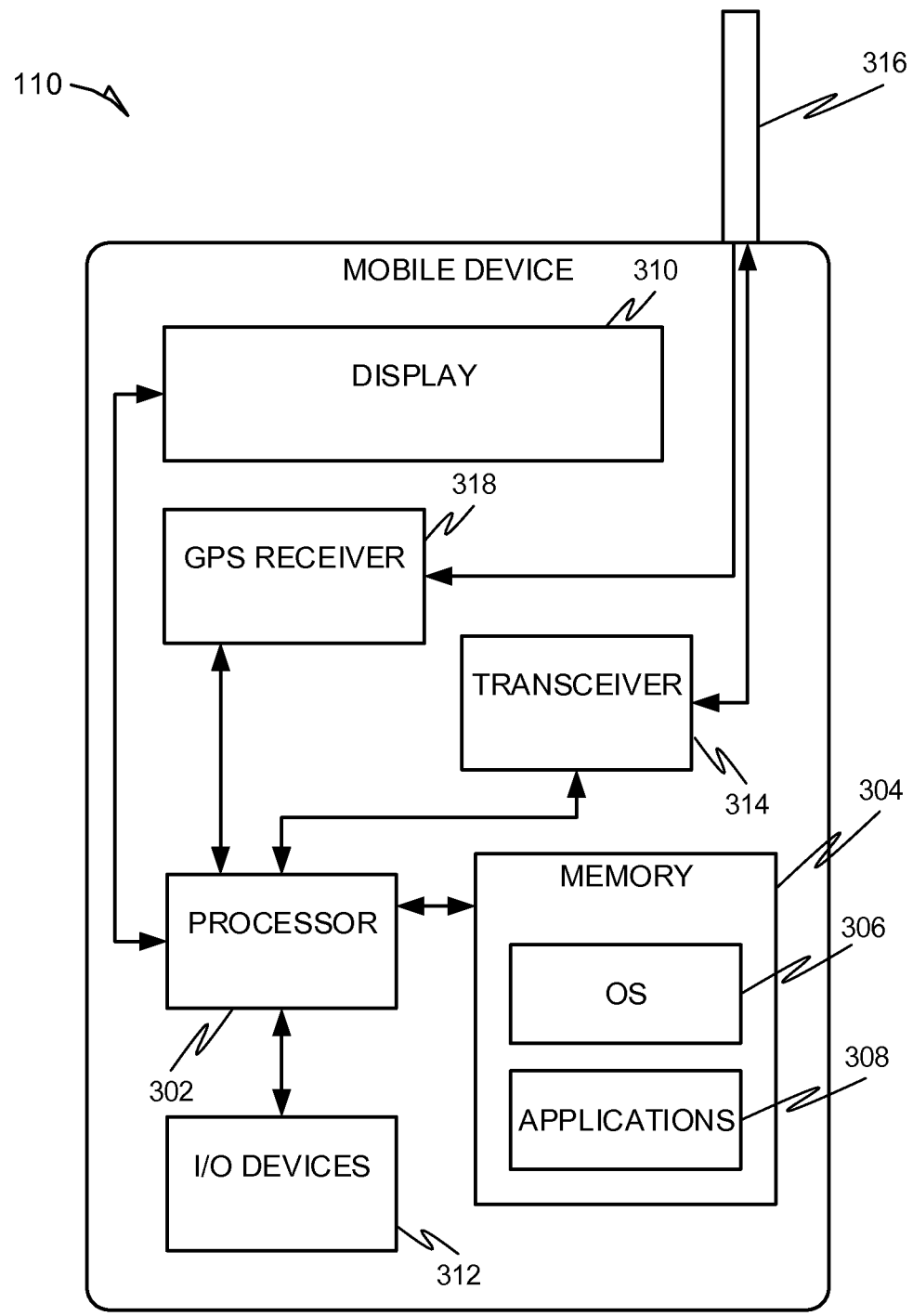
FIG. 3 illustrates an exemplary client machine according to aspects of the disclosure.

FIG. 3 illustrates one example of the client machine 110 in accordance with aspects of the disclosure. In one embodiment, the client machine 110 may be a mobile device. The mobile device may include a processor 302. The processor 302 may be any of a variety of different types of commercially available processors suitable for mobile devices (e.g., an ARM architecture microprocessor, a Microprocessor without Interlocked Pipeline Stages (MIPS) architecture processor, or another type of processor). A memory 304, such as a random access memory (RAM), a flash memory, or another type of memory, is typically accessible to the processor 302. The memory 304 may be adapted to store an operating system (OS) 306, as well as applications 308, such as a mobile location enabled application that can provide location-based services to a user. The processor 302 may be coupled, either directly or via appropriate intermediary hardware, to a display 310 and to one or more input/output (I/O) devices 312, such as a keypad, a touch panel sensor, a microphone, and the like. In some embodiments, the display 310 comprises a touchscreen display capable of functioning as an I/O device. Similarly, in some embodiments, the processor 302 can be coupled to a transceiver 314 that interfaces with an antenna 316. The transceiver 314 may be configured to both transmit and receive cellular network signals, wireless data signals, or other types of signals via the antenna 316, depending on the nature of the client machine 110. Further, in some configurations, a GPS receiver 318 may also make use of the antenna 316 to receive GPS signals.

The applications 308 of the client machine 110 may further include one or more browser applications, such as mobile browser applications, which may be used to provide a user interface to permit the user to browse information available over a network interface. The applications 308 may further include one or more provider-specific mobile applications (alternatively referred to herein as "mobile apps"), downloaded (e.g., downloaded by the user from a mobile software distribution platform) and resident on the client machine 110, that enable the user to access content through the mobile app in addition to through said mobile browser application.

As referred to herein, mobile browsers and mobile apps may describe computer programs designed to run specifically on mobile devices such as smartphones, tablet computers, other handheld computing devices, etc. Mobile browsers and mobile apps may be designed with consideration to the constraints (e.g., low-power processors, limited memory, etc.) and features (e.g., location identification capabilities using geo-location sensors, integrated cellular telephone connectivity, etc.) of mobile devices. Mobile browsers and mobile apps may also implement mobile user interface (UI) designs that consider constraints of the screen size of the display 310, touchscreen capabilities of the display 310, etc.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments. It is contemplated that any features of any embodiments disclosed herein can be combined with any other features of any other embodiments disclosed herein. Accordingly, any such hybrid embodiments are within the scope of the present disclosure.

Figure 4:
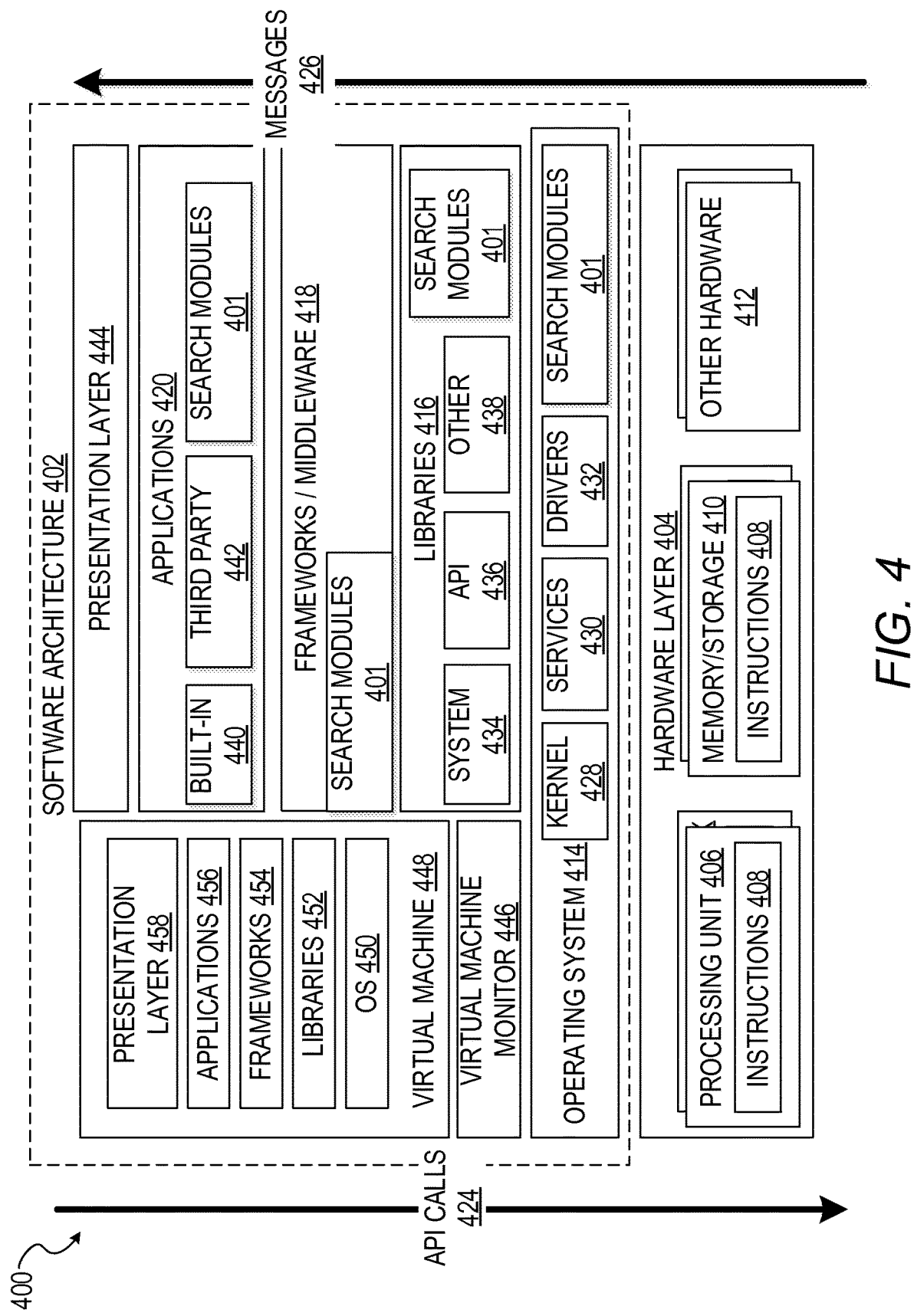
FIG. 4 is a block diagram illustrating components of a machine, according to some example embodiments, able to read instructions from a machine-readable medium and perform any one or more of the methodologies discussed herein, according to aspects of the disclosure.

FIG. 4 is a block diagram 400 illustrating a representative software architecture 402, which may be used in conjunction with various hardware architectures herein described according to aspects of the disclosure. FIG. 4 is merely a non-limiting example of a software architecture 402 and it will be appreciated that many other architectures may be implemented to facilitate the functionality described herein. The software architecture 402 may be executing on hardware such as machine 500 of FIG. 5 that includes, among other things, processors 510, memory 530, and I/O components 550. A representative hardware layer 404 is illustrated and can represent, for example, the machine 500 of FIG. 5. The representative hardware layer 404 comprises one or more processing units 406 having associated executable instructions 408. Executable instructions 408 represent the executable instructions of the software architecture 402, including implementation of the methods, modules and so forth described herein. Hardware layer 404 also includes memory and/or storage modules 410, which also have executable instructions 408. Hardware layer 404 may also comprise other hardware as indicated by 412 which represents any other hardware of the hardware layer 404, such as the other hardware illustrated as part of machine 500.

In the example architecture of FIG. 4, the software architecture 402 may be conceptualized as a stack of layers where each layer provides particular functionality. For example, the software architecture 402 may include layers such as an operating system 414, libraries 416, frameworks/middleware 418, applications 420 and presentation layer 444. Operationally, the applications 420 and/or other components within the layers may invoke application programming interface (API) calls 424 through the software stack and receive a response, returned values, and so forth illustrated as messages 426 in response to the API calls 424. The layers illustrated are representative in nature and not all software architectures 402 have all layers. For example, some mobile or special purpose operating systems 414 may not provide a frameworks/middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 416 may provide a common infrastructure that may be utilized by the applications 420 and/or other components and/or layers. The libraries 416 typically provide functionality that allows other software modules to perform tasks in an easier fashion than to interface directly with the underlying operating system 414 functionality (e.g., kernel 428, services 430 and/or drivers 432). The libraries 416 may include system 434 libraries (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) may provide a higher-level common infrastructure that may be utilized by the applications 420 and/or other software components/modules. For example, the frameworks 418 may provide various graphic user interface (GUI) functions, high-level resource management, high-level location services, and so forth. The frameworks 418 may provide a broad spectrum of other APIs that may be utilized by the applications 420 and/or other software components/modules, some of which may be specific to a particular operating system or platform.

The applications 420 include built-in applications 440 and/or third party applications 442. Examples of representative built-in applications 440 may include, but are not limited to, a contacts application, a browser application, a book reader application, a location application, a media application, a messaging application, and/or a game application. Third party applications 442 may include any of the built in applications as well as a broad assortment of other applications. In a specific example, the third party application 442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 442 may invoke the API calls 424 provided by the mobile operating system such as operating system 414 to facilitate functionality described herein.

The applications 420 may utilize built in operating system functions (e.g., kernel 428, services 430 and/or drivers 432), libraries (e.g., system 434, APIs 436, and other libraries 438), frameworks/middleware 418 to create user interfaces to interact with users of the system. Alternatively, or additionally, in some systems interactions with a user may occur through a presentation layer, such as presentation layer 444. In these systems, the application/module "logic" can be separated from the aspects of the application/module that interact with a user.

The search modules 401 to execute the search result enhancement operations described herein may comprise any combination of modules included in the applications 420, the firmware/middleware 418, the libraries 416, and the operating system 414.

Some software architectures utilize virtual machines. In the example of FIG. 4, this is illustrated by virtual machine 448. A virtual machine creates a software environment where applications/modules can execute as if they were executing on a hardware machine (such as the machine 500 of FIG. 5, for example). A virtual machine is hosted by a host operating system (operating system 414 in FIG. 4) and typically, although not always, has a virtual machine monitor 446, which manages the operation of the virtual machine as well as the interface with the host operating system (i.e., operating system 414). A software architecture executes within the virtual machine such as an operating system 450, libraries 452, frameworks / middleware 454, applications 456 and/or presentation layer 458. These layers of software architecture executing within the virtual machine 448 can be the same as corresponding layers previously described or may be different.

Figure 5:
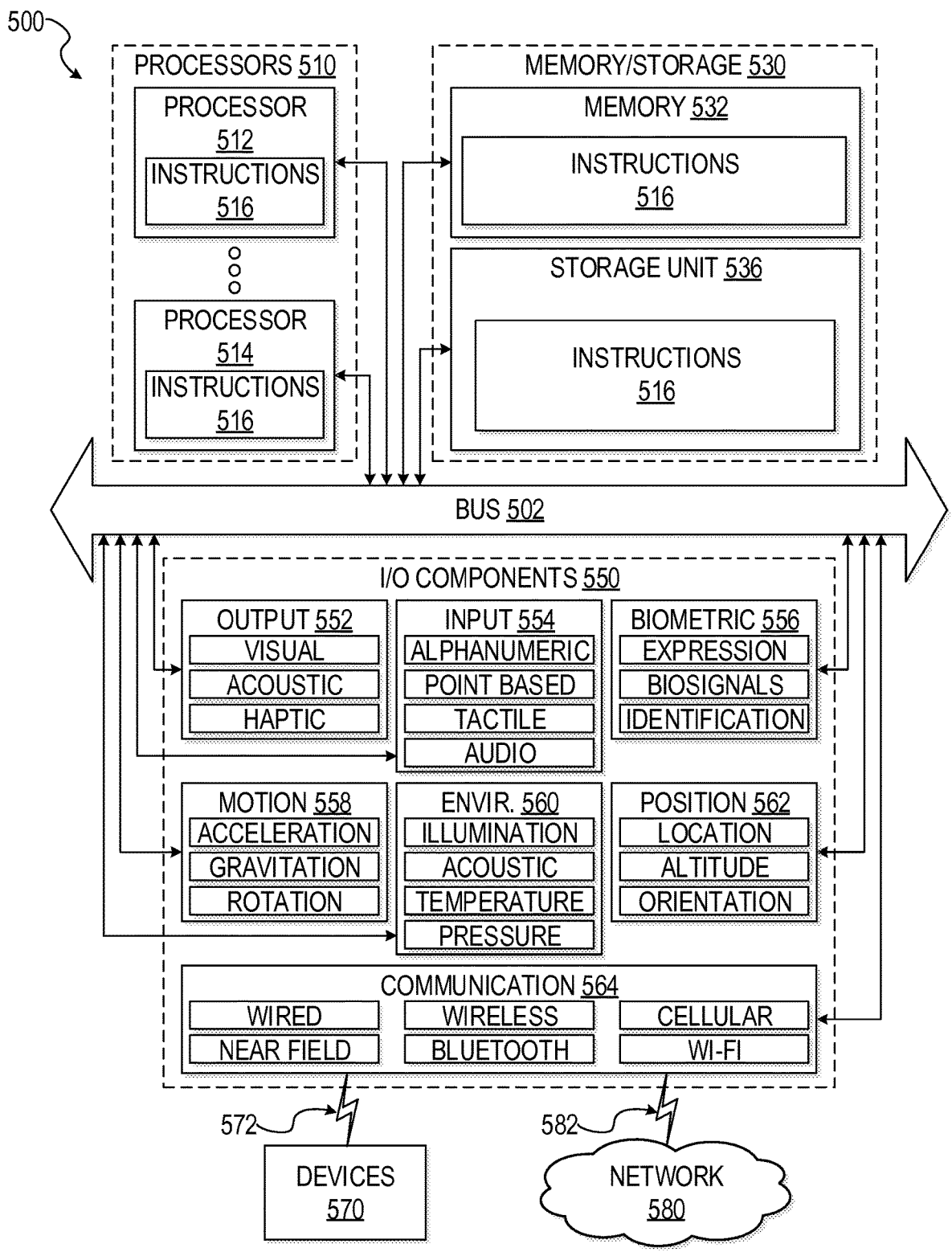
FIG. 5 is a block diagram illustrating components of a machine able to read instructions from a machine-readable medium and perform any one or more of the methodologies discussed herein according to aspects of the disclosure.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions may cause the machine to execute the flow diagrams of FIG. 6 and FIG. 9. Additionally, or alternatively, the instructions may implement the search enhancement modules described herein, and so forth. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 512 and processor 514 that may execute instructions 516. The term "processor" is intended to include a multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core process), multiple processors with a single core, multiple processors with multiples cores, or any combination thereof The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the search enhancement methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as, location via Internet Protocol (IP) geo-location, location via Wi-Fi® signal triangulation, location via detecting a NFC beacon signal that may indicate a particular location, and so forth.

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software.

Figure 6A:
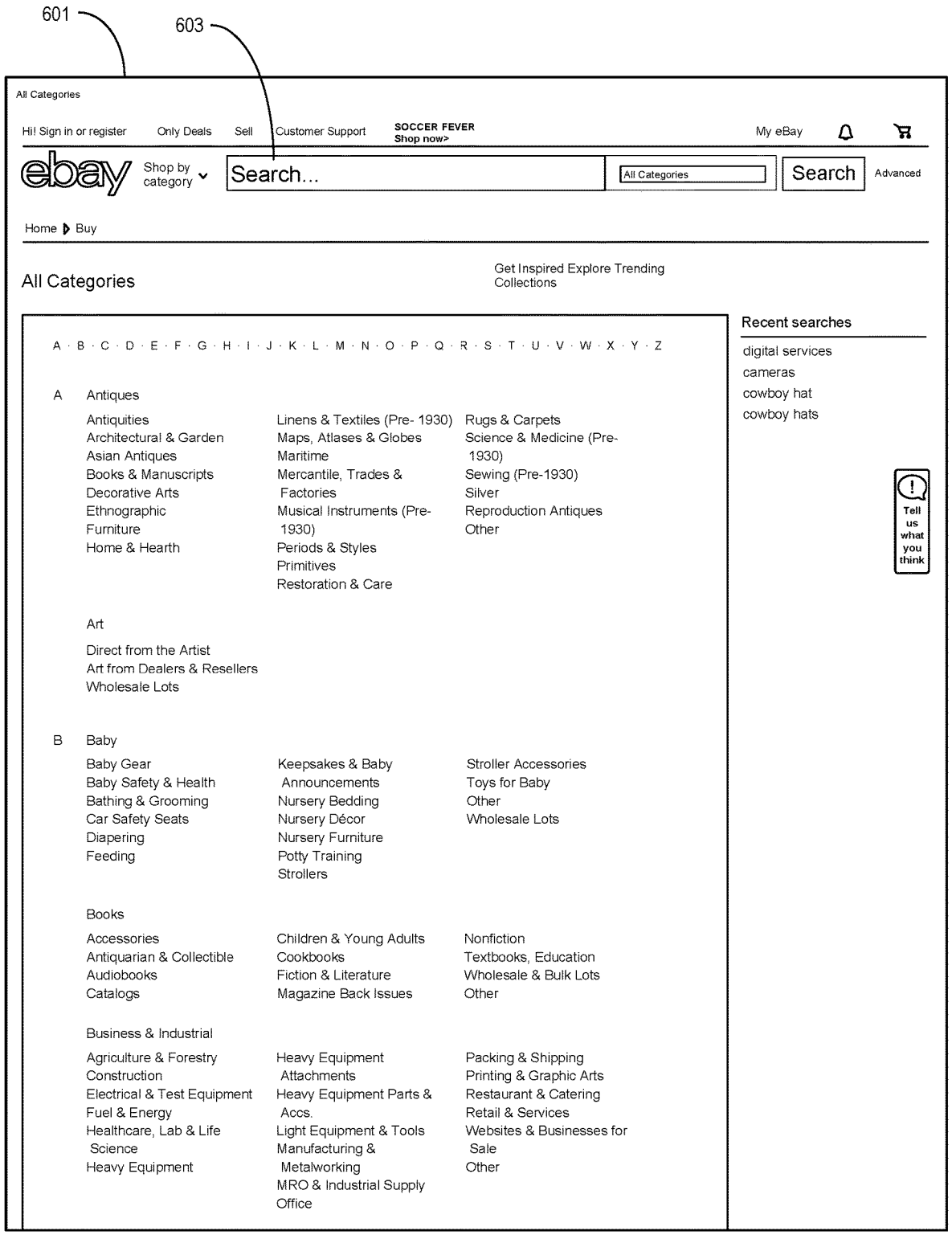

FIG. 6A illustrates a web page 601 of a publication system (e.g., an electronic marketplace) configured to receive search queries for items offered for sale by the electronic marketplace according to aspects of the disclosure. The web page 601 includes an element, such as a text entry box 603, where a user is to provide a search query to search for listings of items offered by the electronic marketplace. The web page 601 and subsequent exemplary web pages illustrated and described below may alternatively comprise mobile browser or mobile app implementations in other embodiments.

A standard search experience in a typical electronic marketplace involves application of multiple refinements by the user to narrow the results returned to the user. Many users may not be familiar with all the possible refinements allowed by a particular search platform, or these refinements may not be easily discoverable to the user.

Figure 6B:
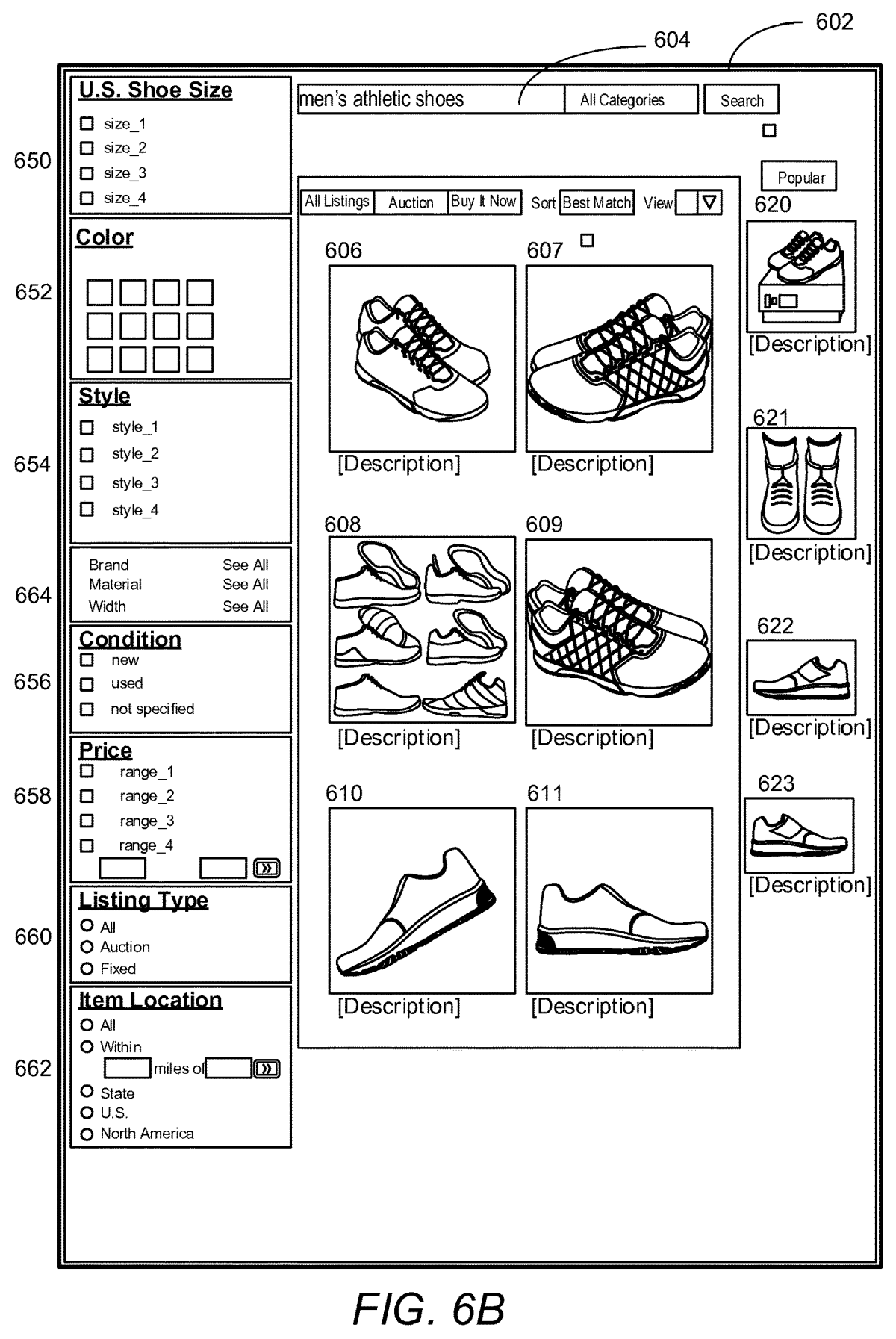
Figure 7:
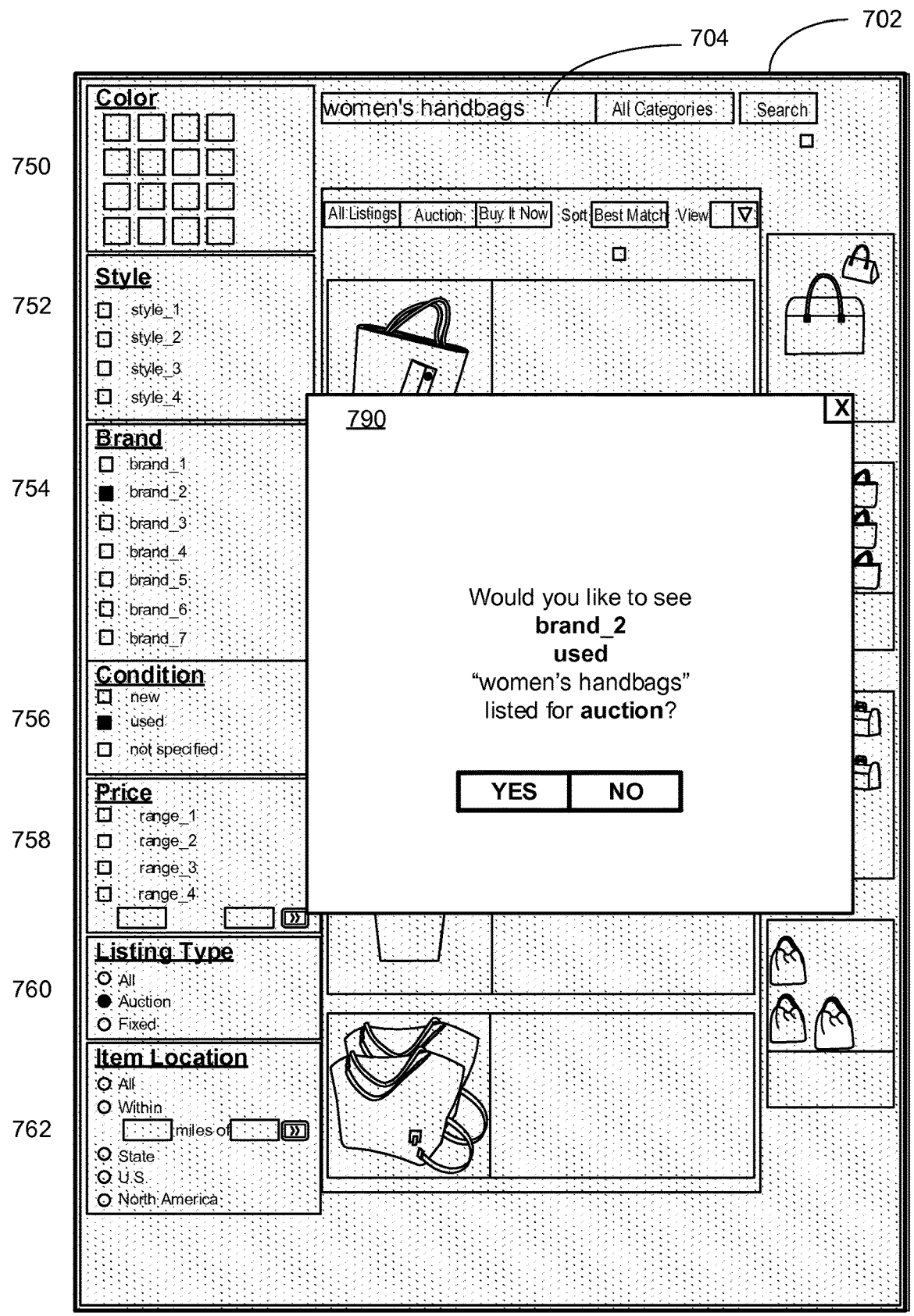
FIG. 7 illustrates another web page of the publication system displaying tentatively enhanced search results according to aspects of the disclosure.

For example, an electronic marketplace is to display user selectable refinements (e.g., user selectable filters discussed in further detail with respect to FIG. 6A, FIG. 6B, and FIG. 7). In general, most users may not apply all these refinements before browsing through the results. For example, if a user is searching for a specific brand of shoes, it is not clear from the keyword itself what category (e.g., men's shoes, formal wear, sportswear, color, size, etc.) he or she is interested in. Depending on the familiarity or context of the user (e.g., the user may not yet be sure of his or her search preferences), he or she may or may not apply all the various refinements that would make the results more relevant.

FIG. 6B illustrates another web page 602 of the publication system displaying search results in response to a received search query 604 according to aspects of the disclosure. As shown in FIG. 6B, the search query 604 includes a search term such as "men's athletic shoes." The displayed search results includes listings 606-611 that are selected (from a larger set of listings) to be displayed based, at least in part, on the listings' relevance to the term "men's athletic shoes," including listings that have descriptions that match variations of that term (e.g., "sneakers" as a variation of "athletic shoes"). In addition, each of the descriptions of the listings may include a title, price, brand identification, etc.

In this embodiment, listings 620-623 comprise a second set of listings that are selected for display according to a different metric from that used to select the listings 606-611. In this embodiment, the listings 620-623 are displayed based, at least in part, on popularity (i.e., different user views) in addition to relevance to the search query 604.

In this embodiment, a plurality of filters 650-664 and corresponding filter values are displayed; these filters are selectable for narrowing the scope of displayed search results for the search query 604. The filters 650-664 are shown in this example to include a size filter 650, a color filter 652, an item style filter 654, an item condition filter 656, a price filter 658, a listing type filter 660, and an item location filter 662. The price filter 658 and the item location filter 662 are shown to accept manual user input to configure the filter. In addition, an expandable filter set 664 is displayed to allow the user to further narrow the scope of displayed search results for the search query 604.

As discussed above, in the event that the user does not utilize some or any of the filters 650-664, embodiments infer one or more refinements to help make the results more relevant for the user as the user is interacting with the search platform during a single session. In some embodiments, refinements may further be based on item/listing characteristics not listed as a user-selectable filter value.

Figure 6C:
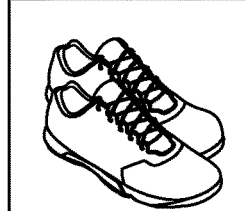

FIG. 6C illustrates the web page 602 of the publication system displaying search results (in response to the received search query 604) further narrowed based on the user's interactions with the previously displayed listings 606-611 and/or the listings 620-623. In this example, based on the user's action or actions on the previous results/listings, it is to be inferred that the user is looking for a specific item style, a specific item condition, and a specific item listing type. For example, the user is to have acted upon several listings having shared characteristics for style, condition, and listing type. Thus, the filters 654, 656, and 660 are automatically selected to produce a narrower set of results/listings when the search query 604 is re-executed (e.g., if the user subsequently enters the same or a similar search, if the user returns to a stage of his or her browsing history such that the search query 604 is re-executed, etc.).

In this example, the listings 606, 609-611 are displayed in addition to listings 612 and 613, as these listings match the aforementioned selected filters. Listings 620 and 621 are also displayed with new listings 624 and 625; as discussed above, these listings are selected and displayed based, at least in part, on popularity (i.e., different user views) in addition to relevance to the search query 604 and the aforementioned selected filters.

In some embodiments, search results are automatically narrowed based on recent user interactions; in other embodiments, search results are selectively narrowed. For example, a decision to automatically narrow search results or suggest narrowed search results to the user is to be based on an analysis to determine the likelihood that a user would want the search results narrowed (e.g., a confidence score determined based on analyzing user activity).

FIG. 7 is another web page 702 of the publication system displaying search results in response to a received search query 704 according to aspects of the disclosure. In this embodiment, the search query 704 includes a search term such as "women's handbags." In this embodiment, a plurality of filters 750-762 and corresponding filter values are displayed; these filters are selectable for narrowing the scope of displayed search results for the search query 704.

In this example, based the user's action on the previous results/listings for the same or a similar search, it is to be inferred that the user is looking for a specific item brand, a specific item condition, and a specific item listing type. Thus, filters 754, 756, and 760 are selected to produce a narrower set of results and listings for the search query 704 (i.e., in contrast to the results produced without said filters selected) (these filters are unselected if the user declines to view these search results.

In this embodiment, a pop-up window 790 is displayed. The pop-up window 790 informs the user what filters have been tentatively selected, and asks if the user wishes to proceed with these narrowed results. The pop-up window 790 may be displayed by default, or may be displayed in response to determining the likelihood that the user would want the search results narrowed (e.g., a confidence score determined based on analyzing user activity). For example, in some embodiments, the pop-up window 790 is displayed if the search query 704 is similar to, but not exactly the same as, a previous search query, to ensure that the inferred filters are appropriate to apply. In some embodiments, the pop-up window 790 is displayed if detected common item listing characteristics fails to meet a high threshold. For example, if the user has performed actions (e.g., viewing a listing, bidding on a listing, etc.) on a percentage of listings having common item listing characteristics (in this example, item listings having said item brand, item condition, and item listing type) that is less than a first value (e.g., less than 70%) but greater than a minimum value (e.g., greater than 50%), embodiments may display the pop-up window 790 and inform the user of the inferred filter values that are "likely" to produce ideal search results.

Thus, a typical search experience in an e-commerce marketplace may contain components such as search results and product listings. The search results usually include a list of product listings matching the search context (e.g., listings 606-611 of FIG. 6B), additional modules to refine/pivot the current search context (e.g., filters 650-664 of FIGS. 6B-6C), and other context modules such as modules for merchandising other products, advertisements, etc. The product listings include detailed information about a product such as images of the product, product attributes, pricing information, seller information, transaction information, and interaction elements.

A typical search and finding attempt by a user includes several impressions of both the search results and product listings. Based on the user's interactions with one or more of these impressions, embodiments may enhance the user's search experience at any given point in the user's product finding attempt based on interactions with the search results and product listings in the same finding attempt (i.e., during the same communication session). These enhancements may include generating more relevant search results and product listings for display, recommending/merchandising alternative inventory, automatically filtering/limiting certain inventory, recommending alternative search queries that better match the user's intent, etc.

Search results and product listings may either be implemented as separate entities, or combined into a single seamless experience. The search results may comprise many components—e.g., current search context, a list of product listings matching the search context, additional modules to change the current search context (e.g., refine, pivot, etc.), interaction elements, promotional links to a product listings page, promotional links to a new search context, promotional links to other internal and external content pages, etc.; examples of promotional links are merchandising, sponsored advertisements, deals, etc.

User interactions with the search results may include adding/removing constraints to/from the current search context (e.g., selection/de-selection of filters 650-664 of FIGS. 6B-6C), changing display properties (e.g., listings per page, sort type, list of displayed product attributes, order of the modules on the page, etc.), paginating to the next or previous set of product listings, and starting a new product finding attempt. The user may start a new finding attempt by modifying the search query. This new finding attempt may be related to the previous finding attempt, or may be unrelated. For example, a related finding attempt is to be detected based on addition or removal of keywords from the previous search query. A related finding attempt is to also be detected if the current search query belongs to the same product category as the previous search query. Furthermore, any two finding attempts occurring within a span of time may be considered as related to one another.

The list of product listings shown as search results may be implemented as a list of condensed versions of the corresponding product listings pages (e.g., similar to the product listings illustrated in 606-613 illustrated in FIG. 6B and FIG. 6C). Any user interaction with this condensed view of a specific product listing on the search results page is to be mapped back to the original product listings page contained more detail that the condensed versions of the corresponding product listings. As discussed above, the product listings page usually consists of detailed information about the product such as pictures, product attributes, pricing information, seller information, product reviews, transaction information, interaction elements, promotional links to a product listings page, promotional links to a new search context, and promotional link to other internal and external content pages. Examples of promotional links are merchandising, sponsored advertisements, deals, etc.

The condensed view of the product listings page may display one or more of the above-mentioned content modules. User interactions on the condensed product listings pages in the search results page may comprise hovering over a specific product listing, clicking on a specific product listing, etc. User interactions on the (full) product listings page may comprise purchasing the product, adding the product to a shopping cart, bidding on the product, adding the product to a list, asking the seller of the product a question, adding the product to a collection/theme of products, submitting an offer to buy the product at a price different from the listed price, sharing of the product listing via social networks, etc. The user may also interact by hovering or clicking on the various modules outlined above in the product listings page.

Figure 8A:
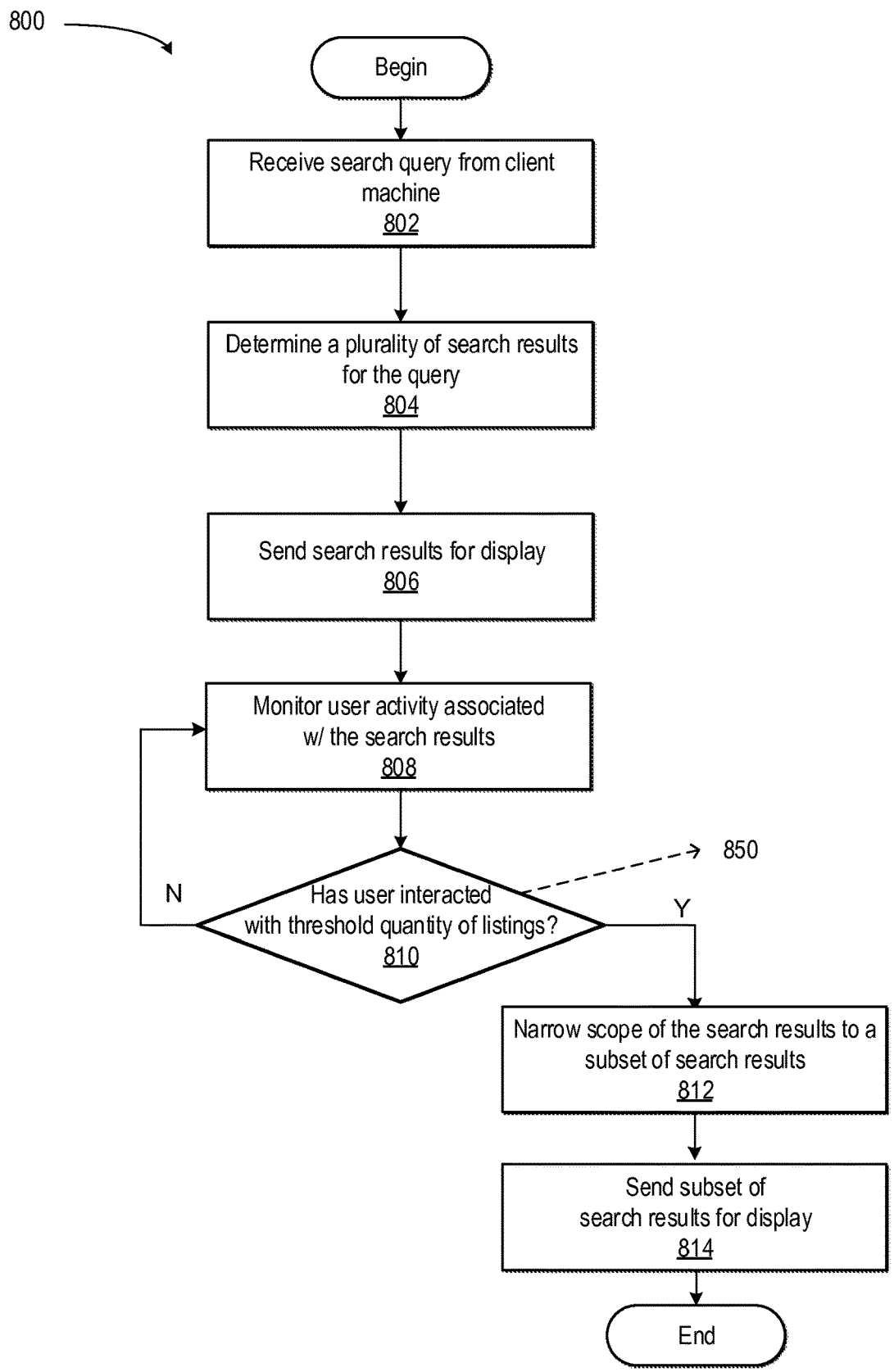
FIGS. 8A-8B illustrate exemplary logic flows for determining enhanced search results based on recent user interactions according to aspects of the disclosure.
Figure 8B:
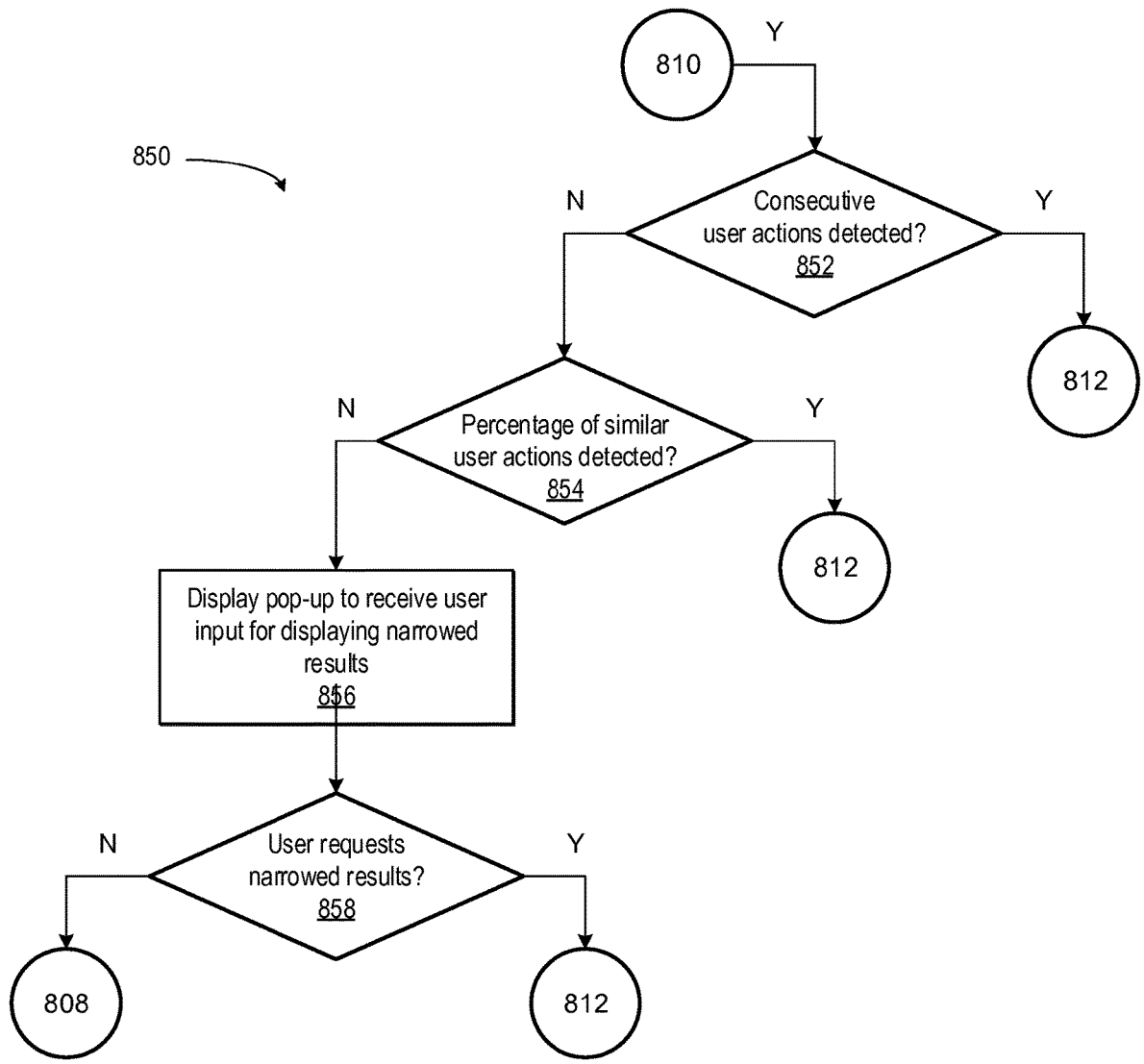

FIGS. 8A-8B illustrate exemplary logic flows for determining enhanced search results based on recent user interactions according to aspects of the disclosure.

FIG. 8A illustrates a logic flow 800 that includes executing an operation to receive a search query, from a client machine, for an item offered for sale through a publication system (e.g., an electronic marketplace) (block 802). An operation to determine a plurality of search results is executed (block 804), wherein each search result is associated with an item listing including item information (e.g., price, listing type, item characteristics, item description, etc.). An operation to send the search results to the client machine for display is executed (block 806).

User activity associated with the displayed search results is monitored (block 808). User actions of interest may include a user selection of a listing (i.e., selecting a listing to view in further detail), a user bid on a listing, a user purchase of a listing, addition of the listing to a user watch list, etc. It is determined if there have been user actions associated with a threshold number of the displayed listings (block 810). If the threshold number has not been exceeded (e.g., the user has just started to view the listings), the user actions are to be further monitored, and the flow returns to block 808. If the threshold number has been exceed, the search results are narrowed based on the user selected items (block 812), and sent to the client machine for display (block 814).

The threshold number of user actions discussed above may be a threshold number of consecutive listings the user performs an action on, a threshold percentage of listings in the current session that the user performs an action on, etc. FIG. 8B illustrates a logic flow 850 that determines whether enough user actions have been performed in order to at least tentatively narrow the results for the search query. In this embodiment, it is determined if the user actions on the search results from block 810 have a common characteristic, and if the user has acted on a predetermined minimum number of listings consecutively (block 852). If so, then block 812 is executed; if not, it is determined if the user has acted on a predetermined minimum percentage of listings (block 854). As discussed above, embodiments may utilize a plurality of percentage thresholds, a first threshold indicating that a high percentage (e.g., over 70%) of listings the user has acted upon include one or more common characteristics, and a second, lower threshold. For example, if a little over half of listings the user has acted upon include one or more common characteristics, a request for user input is displayed, such as a pop-up window (block 856), so that the user is to specify whether results should be narrowed (block 858).

Figure 9:
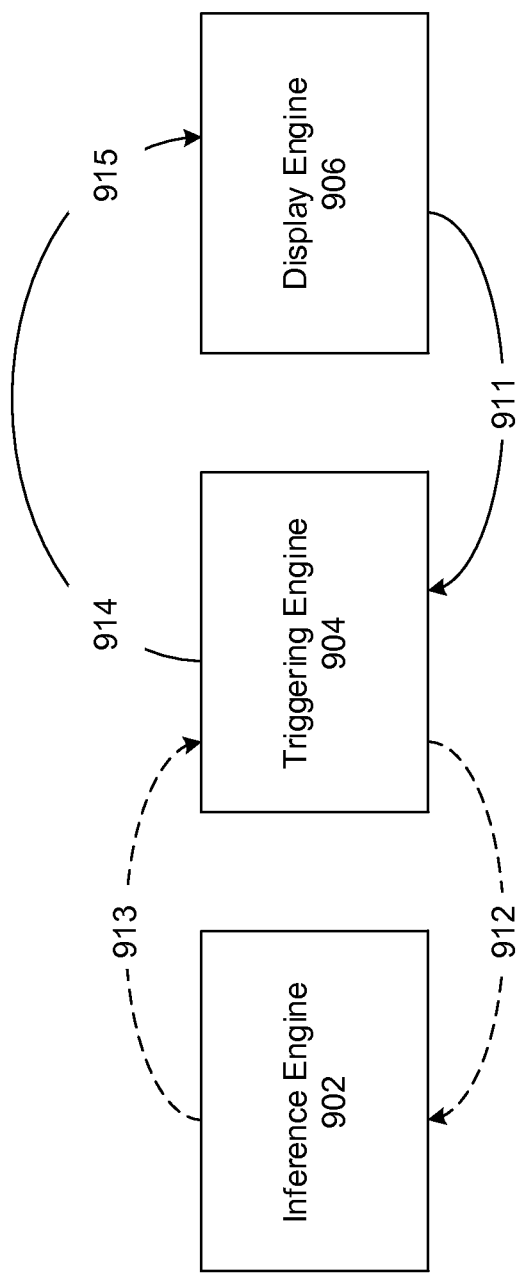
FIG. 9 is an illustration of system components and operations for displaying default and enhanced search results according to aspects of the disclosure.

FIG. 9 is an illustration of system components and operations for displaying default and enhanced search results according to aspects of the disclosure. FIG. 9 illustrates an inference engine 902, a triggering engine 904, and a display engine 906, which generate content to be displayed to a user. The inference engine 902 executes operations to determine a second set of search results based on interactions with a first set of search results and product listing pages in a current finding attempt. In other words, the inference engine 902 determines search results to satisfy a query where the search results are specific to the user. The inference engine observes both the generated content shown to the user and the content acted upon by the user as described above (for example, process 850 of FIG. 8B); the display engine 906 executes operations for showing the content of a page to the user, and also for capturing the user's interactions with this content.

The display engine 906 is aware of the current page type (e.g. search results page, product listings page, etc.), current search/product context, client device capabilities, client device location, current time, and the content of all the modules on the current page. Before rendering the content to be displayed to the user, the display engine 906 is to query the triggering engine 904 to check if any enhancements need to be made to the content on the current page (shown as operation 911).

The triggering engine 904 queries the inference engine 902 to obtain the a more specific search query for the user, and determines if the content on the current page (i.e., either the search results page or the product listings page) is aligned with that more specific search query (shown as operation 912); for example, the triggering engine determines if the search results for the user's search query alone are aligned with search results for the more specific search query that further includes data for the content acted upon by the user as described above. If the triggering engine 904 determines that the content is not well aligned, it request and receives potential enhancements to the content on the current page from the inference engine 904 (shown as operation 913) so that the search results are updated to better serve the user's needs. As illustrated herein, operations 912 and 913 are to be executed multiple times prior to triggering enhancements to the content on the current page. In other words, the triggering engine 904 is engaged at each user impression, and user impressions and user interactions are recorded by the inference engine 902.

As discussed above, a usual finding attempt by a user includes a series of content pages shown to the user in response to the user's interactions on previous content pages. Search results and product listing page impressions, with all their respective content and states, are observed and recorded by the inference engine 902. Similarly, each user interaction on those pages is also observed and recorded by the inference engine 902.

These user interaction records are stored, for example, as a series of nodes in a graph structure, as an aggregation of the impression counts and the interaction counts of modules and sub-modules, or by any other similar means (and may be referred to herein as a summary of the underlying records). Furthermore, the aggregation of user interactions may be implemented in several forms—e.g., a simple linear combination of the counts, simple non-linear combination of the counts, weighted linear combination of the counts, weighted non-linear combination of the counts, etc. In some embodiments, "counts" comprises metrics of what is being shown to the user, and what is being interacted upon by the user, such as product listing categories, product listing formats, product listing conditions, product listing price ranges, and so forth. For example, counts related to product listing categories count the distribution of listings shown and the distribution of listings interacted upon (shown=[Electronics: 40, Collectibles: 10, Books: 5]; interacted=[Electronics:0, Collectibles:2, Books:3]).

The weights may be proportional to a combination of one or more factors such as the recentness of the event, importance of the event (e.g., purchase interactions may be determined to be more important than click interactions), client device used for the event, location for the event, time for the event, etc. Furthermore, either the underlying records or the summary of the underlying records for related finding attempts may themselves be aggregated by the inference engine 902.

At any given point in a finding attempt, the inference engine 902 is able to provide a summary of content seen by the user, and a summary of user interactions with that content. The triggering engine 904 computes the "difference" between the current content shown to the user and the "summary" of user interactions. In some embodiments, standard graph algorithms or statistical methods may be used to compute this difference and a measure of confidence for the difference based on the underlying technology used for summarization. In other words, the measure of confidence is related to the aggregation implementation; both how the "difference" between what was shown and what was interacted upon is computed, and the confidence that this difference is something significant is dependent upon the aggregation method.

At any given point in a finding attempt, the triggering engine 904 is able to compute a ranked list of differences along with their corresponding confidence scores. The ranking of differences may be computed based on the combination of one or more factors such as magnitude of the difference, confidence for the difference, type of the underlying property for which the difference was computed, etc. Based on configurable rules, the triggering engine 904 is to decide to check if any or all of the differences are relevant to the content on the current page. Some examples of the rules are a minimum threshold for the ranking score, black list or white list of differences, etc. Furthermore, the triggering engine 904 is to also check if any or all of the properties associated with the differences conflict with the properties of the current page. The term "black list" refers to computed differences that can be ignored, while the term "white list" refers to computed differences that are acted upon. For example, differences based on product listing formats can be black list differences, and hence this type of difference from the rankings would be ignored. Similarly, differences based on product listing price ranges can be white list difference, and hence this type of difference in the rankings would be included despite possibly scoring lower by the ranking algorithm. Based on these two checks, the triggering engine 904 is to decide to either enhance the content on the current page or leave it unchanged (shown as operation 914).

If the triggering engine 904 decides to enhance the content on the current page, based on configurable mappings and the previous checks, it may also decide which properties/content to add/remove on the current page based on the list of differences. This information is to be passed along to the display engine 906 (shown as operation 915). For example, this information is to be passed as a list of commands, wherein each command is to comprise an action, associated data to perform that action, and additional restrictions and metadata for that action.

The display engine 906 receives a list of commands from the triggering engine (shown as operation 915) such that the current content of the search results page or the product listings page is to be changed. For example, content modules may be added to or removed from the page, additional content including promotional links may be added to or removed from the page, the product inventory shown on the page may be expanded or constrained by adding or removing constraints on the search results, the ranking of the list of product listings (i.e., the order of the listings) shown on a search results page may be altered, etc. Other commands may include highlighting or hiding one or more product attributes, changing display properties of the current page such as size, orientation, language, etc., opening new pages or tabs in a web browser, opening mobile applications of a mobile client device, etc.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a display engine to:
   generate graphical user interface (GUI) data for a first plurality of item listings of a publication system to be displayed via a client device in response to a search query received from the client device;
   transmit the GUI data to the client machine for display; and
   a triggering engine to:
   identify user actions associated with a subset of the first plurality of item listings comprising a threshold quantity of item listings;
   identify one or more item attributes of at least a portion of the subset of the first plurality of item listings;
   the inference engine to select a second plurality of item listings based, at least in part, on the one or more item attributes of the subset of the first plurality of item listings; and
   the display engine to transmit updated GUI data for the second plurality of item listings to the client machine for display.

2. The system of claim 1, wherein the user actions associated with the subset of the first plurality of item listings include at least one of a user selection of an item listing, a user bid on an item listing, a user purchase of an item listing, or an addition of an item listing to a user watch list.

3. The system of claim 1 wherein the user actions associated with the subset of the first plurality of item listings include a user selection of an item listing and the user viewing the item listing for at least a predetermined time period.

4. The system of claim 1 wherein each of the item listings in the subset of the first plurality of item listings comprises a same item attribute.

5. The system of claim 4, wherein identifying the user actions associated with the subset of the first plurality of item listings comprises identifying the threshold quantity of consecutive user actions on item listings comprising the same item attribute.

6. The system of claim 4, wherein the same item attribute comprises one or more words included in each item listing associated with each of the threshold quantity of item listings.

7. The system of claim 4, wherein the same item attribute comprises an item listing type, wherein the item listing type comprises an auction-based item listing or a fixed-price item listing.

8. A method comprising: during a data communication session:
during a data communication session:
receiving a search query for an item listed via a publication system from a client machine;
identifying a first plurality of item listings, from a plurality of offered item listings, satisfying the received search query;
sending the first plurality of item listings to the client machine;
monitoring user actions associated with the first plurality of item listings; and
in response to identifying user actions associated with a subset of the first plurality of item listings comprising a threshold quantity of item listings:
identifying one or more item attributes of at least a portion of the subset of the first plurality of item listings;
selecting a second plurality of item listings based, at least in part, on the one or more item attributes of the subset of the first plurality of item listings; and
sending the second plurality of item listings to the client machine for display.

9. The method of claim 8, wherein the user actions associated with the subset of the first plurality of item listings include at least one of a user selection of an item listing, a user bid on an item listing, a user purchase of an item listing, or an addition of an item listing to a user watch list.

10. The method of claim 8, wherein the user actions associated with the subset of the first plurality of item listings include a user selection of an item listing and the user viewing the item listing for at least a predetermined time period.

11. The method of claim 8, wherein each of the item listings in the subset of the first plurality of item listings comprises a same item attribute.

12. The method of claim 11, wherein identifying the user actions associated with the subset of the first plurality of item listings comprises identifying the threshold quantity of consecutive user actions on item listings comprising the same item attribute.

13. The method of claim 11, wherein the same item attribute comprises one or more words included in each item listing associated with each of the threshold quantity of item listings.

14. The method of claim 11, wherein the same item attribute comprises an item listing type, wherein the item listing type comprises an auction-based item listing or a fixed-price item listing.

15. The method of claim 8, wherein sending the second plurality of item listings to the client machine for display is in response to receiving a user input request to display the second plurality of item listings.

16. A non-transitory machine-useable storage medium embodying instructions which, when executed by a machine, cause the machine to perform a process including operations to:
during a data communication session:
receive a search query for an item listed via a publication system from a client machine;
identify a first plurality of item listings, from a plurality of offered item listings, satisfying the received search query;
send the first plurality of item listings to the client machine;
monitor user actions associated with the first plurality of item listings; and
in response to identifying user actions associated with a subset of the first plurality of item listings comprising a threshold quantity of item listings:
identifying one or more item attributes of at least a portion of the subset of the first plurality of item listings;
selecting a second plurality of item listings based, at least in part, on the one or more item attributes of the subset of the first plurality of item listings; and
sending the second plurality of item listings to the client machine for display.

17. The non-transitory machine-useable storage medium of claim 16, wherein the user actions associated with the subset of the first plurality of item listings include at least one of a user selection of an item listing, a user bid on an item listing, a user purchase of an item listing, or an addition of an item listing to a user watch list.

18. The non-transitory machine-useable storage medium of claim 16, wherein the user actions associated with the subset of the first plurality of item listings include a user selection of an item listing and the user viewing the item listing for at least a predetermined time period.

19. The non-transitory machine-useable storage medium of claim 16, wherein each of the item listings in the subset of the first plurality of item listings comprises a same item attribute.

* * * * *

UNITED STATES PATENT AND TRADEMARK OFFICE
CERTIFICATE OF CORRECTION

PATENT NO. : 10,489,407 B2
APPLICATION NO. : 14/717805
DATED : November 26, 2019
INVENTOR(S) : Sameep Navin Solanki et al.

It is certified that error appears in the above-identified patent and that said Letters Patent is hereby corrected as shown below:

On the Title Page

Item [60], Provisional Application No. 62/053,055 filed on Sep. 19, 2014.
Delete the phrase "Provisional Application No. 62/053,055" and insert --Provisional Application No. 62/053,066--.

Signed and Sealed this
Twelfth Day of January, 2021

Andrei Iancu
*Director of the United States Patent and Trademark Office*